(12) United States Patent
Taniuchi et al.

(10) Patent No.: US 10,846,760 B2
(45) Date of Patent: Nov. 24, 2020

(54) INFORMATION PROCESSING DEVICE, INFORMATION PROCESSING METHOD, PROGRAM AND STORAGE MEDIUM

(71) Applicant: RAKUTEN, INC., Tokyo (JP)

(72) Inventors: Akio Taniuchi, Tokyo (JP); Asami Ando, Tokyo (JP)

(73) Assignee: Rakuten, Inc., Tokyo (JP)

( * ) Notice: Subject to any disclaimer, the term of this patent is extended or adjusted under 35 U.S.C. 154(b) by 385 days.

(21) Appl. No.: 15/027,893

(22) PCT Filed: Oct. 28, 2014

(86) PCT No.: PCT/JP2014/078605
§ 371 (c)(1),
(2) Date: Apr. 7, 2016

(87) PCT Pub. No.: WO2016/067363
PCT Pub. Date: May 6, 2016

(65) Prior Publication Data
US 2016/0371752 A1    Dec. 22, 2016

(51) Int. Cl.
*G06Q 30/00*     (2012.01)
*G06Q 30/02*     (2012.01)

(52) U.S. Cl.
CPC ..... *G06Q 30/0277* (2013.01); *G06Q 30/0272* (2013.01)

(58) Field of Classification Search
CPC . G06Q 30/0277; G06Q 30/0269; G06Q 30/02
See application file for complete search history.

(56) References Cited

U.S. PATENT DOCUMENTS 6,487,557 B1 * 11/2002 Nagatomo ............ G06F 16/955
9,013,504 B2 *  4/2015 Nishina ................. G01C 21/20
                                                              345/624
(Continued)

FOREIGN PATENT DOCUMENTS

JP    2002-056272 A    2/2002
JP    2005-122762 A    5/2005
(Continued)

OTHER PUBLICATIONS

Dogan; A sliding mode approach to visual motion estimation; 2006 IEEE; p. 73-p. 738; 2006.*
(Continued)

*Primary Examiner* — Radu Andrei
(74) *Attorney, Agent, or Firm* — Sughrue Mion, PLLC

(57) ABSTRACT

An advertisement delivery system 1 includes an information manager, a timing information retriever, a selection determiner, and a selection handling processor. When switching between images displayed in a partial area on a web page is performed, the information manager keeps information about a pre-switching image even after the switching. The timing information retriever retrieves the timing of the switching and the timing of a selection operation by a user on the area. When the timing information retriever retrieves the timing of the selection operation within a predetermined time length after the switching, the selection determiner makes a determination as to which of the pre-switching image and a post-switching image the selection operation is intended for. Based on the determination, the selection handling processor performs a selection handling process based on information about the pre-switching image or the post-switching image.

18 Claims, 8 Drawing Sheets

(56) References Cited

U.S. PATENT DOCUMENTS

| | | | | |
|---|---|---|---|---|
| 2001/0047305 A1* | 11/2001 | Bowen, Jr. | ............ | G06Q 10/087 705/27.1 |
| 2002/0040384 A1* | 4/2002 | Moetteli | ............... | G06F 16/951 709/201 |
| 2004/0190866 A1* | 9/2004 | Lin | ........................ | H04N 5/783 386/346 |
| 2006/0233256 A1* | 10/2006 | Francois | ................ | H04N 19/63 375/240.19 |
| 2007/0223808 A1* | 9/2007 | Kerr | .................. | G06K 9/00771 382/159 |
| 2012/0188281 A1* | 7/2012 | Nishina | .................. | G01C 21/20 345/634 |
| 2012/0213493 A1* | 8/2012 | Luo | ...................... | H04N 9/8211 386/248 |
| 2013/0051776 A1* | 2/2013 | Bowes | .................. | H04N 5/783 386/353 |
| 2013/0265455 A1* | 10/2013 | Shin | ........................ | H04N 5/232 348/211.4 |
| 2014/0300571 A1* | 10/2014 | Tomizu | ................. | G06F 3/0416 345/173 |
| 2015/0134450 A1* | 5/2015 | Castelli | .............. | G06Q 30/0255 705/14.53 |
| 2015/0212655 A1* | 7/2015 | Koski | ..................... | G06F 16/50 715/730 |
| 2017/0357317 A1* | 12/2017 | Chaudhri | ................ | G06F 3/016 |

FOREIGN PATENT DOCUMENTS

| | | |
|---|---|---|
| JP | 2012-230617 A | 11/2012 |
| JP | 2014-098769 A | 5/2014 |

OTHER PUBLICATIONS

Liu; Analysis and enhancement of videos of electronic slide presentations; 2002 IEEE; p. 77-p. 80; 2002.*

International Search Report for PCT/JP2014/078605 dated Feb. 3, 2015 [PCT/ISA/210].

* cited by examiner

Fig. 3

| LOG TYPE | USER TERMINAL INFORMATION | ADVERTISEMENT ID | TIME INFORMATION |
|---|---|---|---|
| ⋮ | ⋮ | ⋮ | ⋮ |

Fig. 8

INFORMATION PROCESSING DEVICE, INFORMATION PROCESSING METHOD, PROGRAM AND STORAGE MEDIUM

CROSS REFERENCE TO RELATED APPLICATIONS

This application is a National Stage of International Application No. PCT/JP2014/078605 filed Oct. 28, 2014, the contents of all of which are incorporated herein by reference in their entirety.

TECHNICAL FIELD

The present invention relates to an information processing device, an information processing method, a program, and a storage medium relating to a process that the information processing device performs in response to an operation by a user on an image displayed in a partial area on a web page presented to the user. Specifically, the invention relates to a process for determining whether an image selection operation performed in switching between displayed images is intended for the image before or after the switching.

CITATION LIST

Patent Literature

Patent Literature 1: JP 2005-122762 A

BACKGROUND ART

Web pages that display advertisement images are widely used. Among such web pages, a web page that displays one advertisement image after another in a certain area at pre-arranged intervals is known, as disclosed in Patent Literature 1. This can achieve advertising effectiveness using a plurality of advertisement images in a limited space on the web page.

SUMMARY OF INVENTION

Technical Problem

However, depending on the timing of switching among the advertisement images and the timing when a user clicks an image, the user may be taken to an unintended advertisement page through screen transition. For example, if the timing when the user clicks an image substantially overlaps with the timing for switching between the advertisement images, the user, who intended to perform a click operation on the advertisement image before the switching, may be taken to an advertisement page linked from the advertisement image after the switching.

Therefore, it is an object of the present invention to prevent image selection not intended by a user and perform a process based on proper image selection.

Solution to Problem

First, an information processing device according to the present invention includes an information manager, a timing information retriever, a selection determiner, and a selection handling processor. When switching between images displayed in a partial area on a web page has been performed, the information manager keeps information about a pre-switching image even after the switching. The timing information retriever retrieves the timing of the switching and the timing of a selection operation by a user on the area. When the timing information retriever retrieves the timing of the selection operation within a predetermined time length after the switching, the selection determiner makes a determination as to which of the pre-switching image and a post-switching image the selection operation is intended for. Based on the determination, the selection handling processor performs a selection handling process based on information about the pre-switching image or the post-switching image.

Thus, when an image selection operation is performed after switching between images, whether the selection operation is intended for the pre-switching image or the post-switching image is determined.

Second, in the information processing device according to the above-described present invention, when the difference between the timing of the switching and the timing of the selection operation is less than or equal to a predetermined time length, the selection determiner performs a confirmation screen presentation process for presenting to a user a confirmation screen to confirm which image a selection operation by the user is intended for, and the selection determiner makes the determination based on an answer by the user on the confirmation screen.

This enables the result of handling the selection operation to reflect the intention of a user, without placing a tremendous burden on the user.

Third, in the information processing device according to the above-described present invention, when the difference between the timing of the switching and the timing of the selection operation is less than or equal to a predetermined time length, the selection determiner determines that an operation by a user subject to the determination is intended for the pre-switching image.

This allows estimation of the image for which the selection operation by a user is intended, without increasing the burden on the user.

Fourth, in the information processing device according to the above-described present invention, information about image selection is the address of a destination web page to be displayed in response to image selection, and the selection handling process is a process for causing the destination web page to be displayed.

This prevents the selection of an image not intended by the user from causing unintended and time-wasting screen transition.

Fifth, in the information processing device according to the above-described present invention, the pre-switching image and the post-switching image are advertisement images.

This prevents the time-wasting screen transition to an advertisement page for an item that the user does not intend to purchase and also prevents the unintended item from being recorded in a viewing history.

An information processing method according to the present invention is an information processing method performed by an information processing device. The method includes the following steps. When switching between images displayed in a partial area on a web page has been performed, information about a pre-switching image is kept even after the switching. The timing of the switching and the timing of a selection operation by a user on the area are retrieved. When the timing of the selection operation is retrieved within a predetermined time length after the switching, a determination is made as to which of the pre-switching image and a post-switching image the selection operation is intended for. Then, a selection handling process based on information about the pre-switching image or the post-switching image is performed based on the determination.

This information processing method enables a process concerning proper image selection to be performed.

A program according to the present invention is a program for causing a processor to execute a process to be performed as the above information processing method.

A storage medium according to the present invention is a storage medium storing the above program. These program and storage medium achieve the above information processing device.

Advantageous Effects of Invention

According to the present invention, image selection not intended by a user can be prevented, and a process based on proper image selection can performed.

BRIEF DESCRIPTION OF DRAWINGS

FIG. 3 is a diagram showing logs stored in a log DB;
FIG. 8 is a diagram showing an example of a confirmation screen.

DESCRIPTION OF EMBODIMENT

This embodiment illustrates an advertisement delivery system 1 that provides a user with advertisement information included in a web page.

The following describes the embodiment in the order listed below.
1. General Configuration
2. Hardware Configuration
3. Process Flow
4. Selection Determination Process
4-1. First Example Process
4-2. Second Example Process
5. Other Modifications
6. Summary
7. Program and Storage Medium In the description below, advertisement images are used as examples of pre-switching and post-switching images. Thus, in the examples below, an example of the "pre-switching image" is referred to as a "pre-switching advertisement", and an example of the "post-switching image" is referred to as a "post-switching advertisement".

1. General Configuration

A general configuration of a network system including the advertisement delivery system 1 according to this embodiment is now described with reference to FIGS. 1 and 2.

Figure 1:
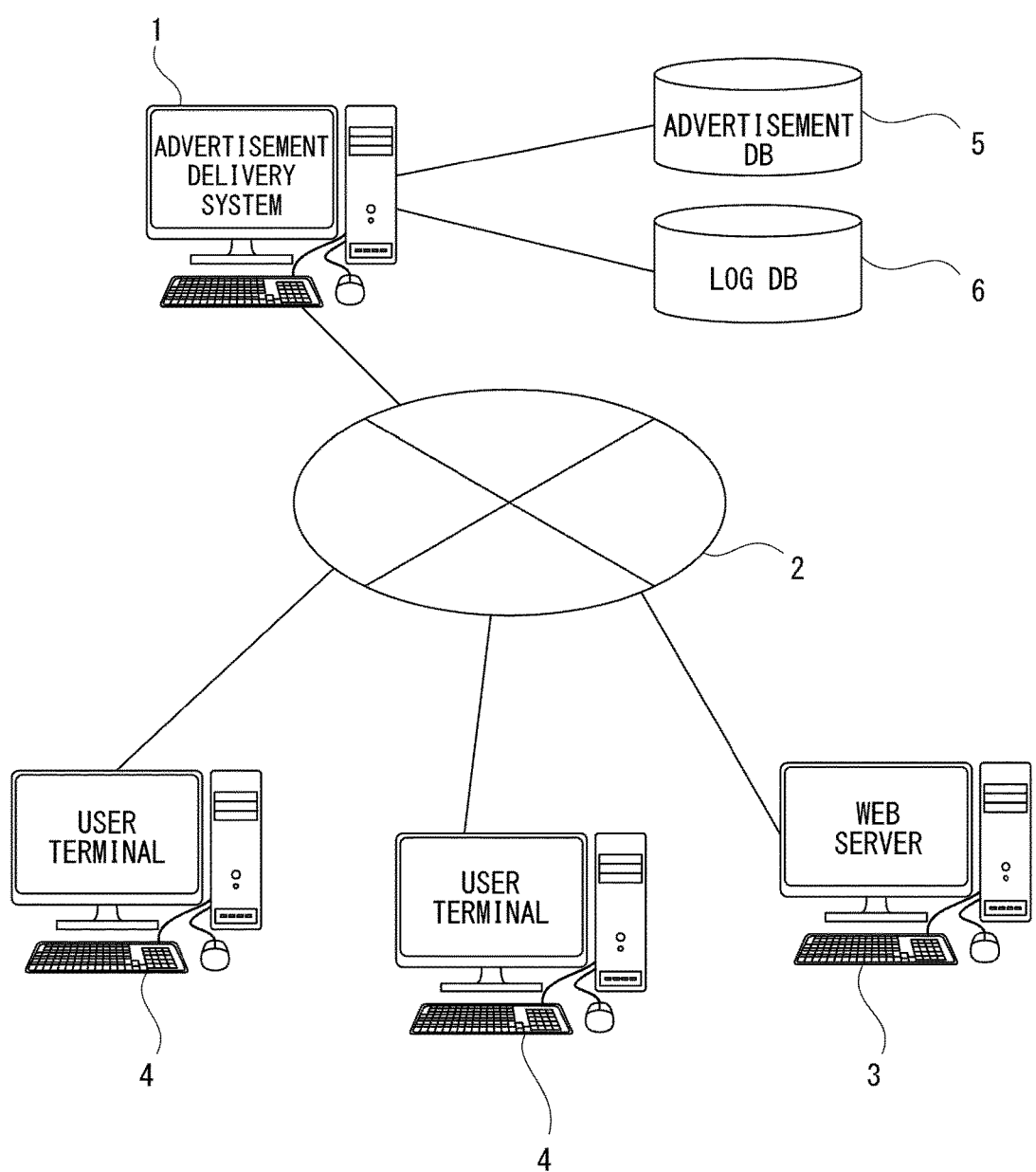
FIG. 1 is a diagram showing a general configuration according to an embodiment of the present invention.

As shown in FIG. 1, the advertisement delivery system 1, which provides a user with advertisement information, is connected to a web server 3 and user terminals 4 over a communication network 2 so that they can communicate with each other.

The advertisement delivery system 1 includes an information processing device that has the function of delivering an advertisement in response to a request from each user terminal 4, the function of storing and managing a log relating to delivery of an advertisement, the function of managing advertisement information, and similar functions.

Examples of the function of delivering an advertisement in response to a request from each user terminal 4 include the function of delivering a simple image of a banner advertisement to be displayed on a web browser running on the user terminal 4, and the function of delivering information that causes a proper advertisement page to be displayed on the user terminal 4 in response to an advertisement selection operation, such as a click on the banner advertisement.

Specifically, the function of storing and managing a log relating to delivery of an advertisement is, for example, the function of performing a process for storing the advertisement identification (ID) of each banner advertisement, a delivery date and time, and a destination in association with each other, and a process for confirming the log to deliver a proper advertisement page (described in detail below).

The function of managing advertisements is the function of storing image data of banner advertisements, Uniform Resource Locator (URL) information and HyperText Markup Language (HTML) data of an advertisement page, and other information as advertisement information registered on the advertisement delivery system 1 by an advertiser.

The configuration of the communication network 2 is not particularly limited. Examples of the communication network 2 can include the Internet, an intranet, an extranet, a local area network (LAN), a community antenna television (CATV) network, a Virtual Private Network, a telephone line network, a mobile communication network, a satellite communication network, and the like.

There can also be various examples of a transmission medium constituting all or a part of the communication network 2. The examples can include not only wires such as an Institute of Electrical and Electronics Engineers (IEEE) 1394, a Universal Serial Bus (USB), a power-line communication, and a telephone line; but also wireless such as infrared light like infrared data association (IrDA), Bluetooth (registered trademark), 802.11 wireless, a mobile telephone network, a satellite channel, and a digital terrestrial network, and the like.

The web server 3 is an information processing device that sends HTML data (hereinafter "web page data") of a web page requested by a user. This web page includes, for example, an advertisement frame that displays one banner advertisement after another at prearranged intervals. The prearranged intervals may be set to be equal for all banner advertisements or different for different banner advertisements.

The user terminal 4 is an information processing device that runs, for example, a web browser for browsing the above web pages. Examples of the user terminal 4 include a personal computer (PC) with communication capabilities, a feature phone, a Personal Digital Assistant (PDA), and a smart device such as a smartphone or a tablet device. When the above web pages generated by the web server 3 are viewed on the user terminal 4, a process for requesting a simple image of a banner advertisement from the advertisement delivery system 1 is performed.

An advertisement database (DB) 5 is a DB that stores various types of data of the advertisements managed by the advertisement delivery system 1. The advertisement DB 5 is connected to the advertisement delivery system 1 so that the advertisement delivery system 1 can store data in and retrieve data from the advertisement DB 5.

A log DB 6 is a DB that stores, for example, logs of various requests by the user terminals 4 to the advertisement delivery system 1. The log DB 6 is connected to the advertisement delivery system 1 so that the advertisement delivery system 1 can store a log in and retrieve a log from the log DB 6.

Figure 2:
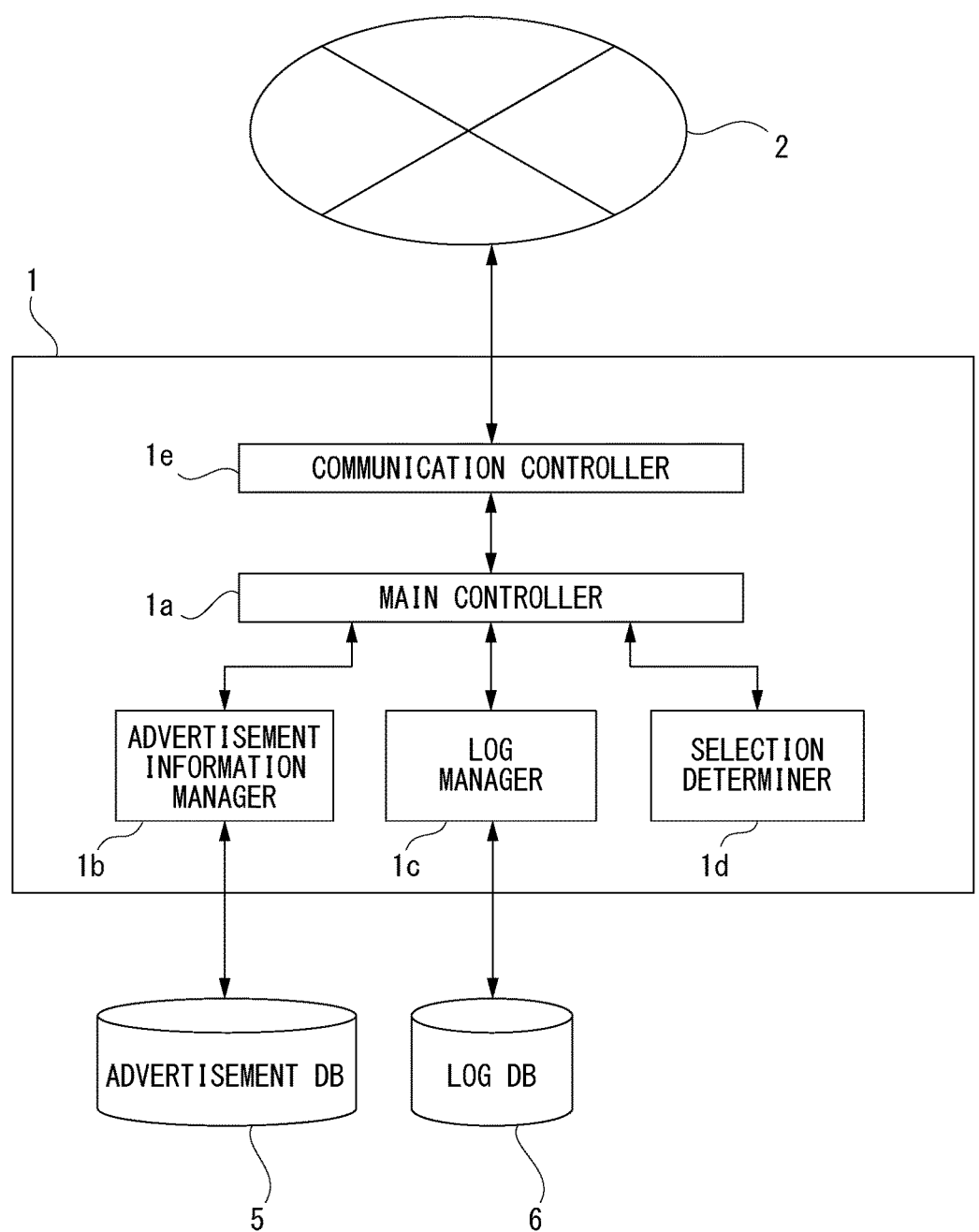
FIG. 2 is a diagram showing a block diagram of an advertisement delivery system 1 according to the embodiment.

As shown in FIG. 2, the advertisement delivery system 1 includes a main controller 1a, an advertisement information manager 1b, a log manager 1c, a selection determiner 1d, and a communication controller 1e.

The main controller 1a processes various requests and data received from the communication controller 1e and performs various processes on various parts. Examples of the various processes include a process for requesting the advertisement information manager 1b to retrieve proper advertisement information for each user; a process for requesting the log manager 1c to store a log in association with user information, a user operation, and timing information; and a process for requesting also the log manager 1c to confirm by a log the operation timing of a banner advertisement selection operation by a user (e.g., an operation to click a banner advertisement).

The advertisement information manager 1b perform a process for retrieving proper advertisement information for each user from the advertisement DB 5. The advertisement information manager 1b may also perform a process for selecting, from among a plurality of advertisements associated with bids for an advertisement frame provided on a web browser of each user terminal 4, an advertisement that matches criteria regarding, for example, bid prices and relationship with a web page.

The log manager 1c performs a process for storing a log in and retrieving a log from the log DB 6 in accordance with a request from the main controller 1a.

In response to the request for confirmation of the above operation timing from the main controller 1a, the log manager 1c also performs a process for confirming the time difference between a log relating to a selected advertisement information request and a log relating to a banner advertisement information request. The selected advertisement information request is sent from the user terminal 4 by selection of a banner advertisement by a user on the user terminal 4. The banner advertisement information request is based on a banner advertisement switching process performed on the user terminal 4 just before the selection.

The log relating to the selected advertisement information request is a log relating to a retrieval request for, for example, the URL information of a destination web page, and is hereinafter referred to as a "selected advertisement information request log". The log relating to the banner advertisement information request is hereinafter referred to as a "banner advertisement information request log".

The main controller 1a receives time difference information as the result of the confirmation from the log manager 1c and performs a process for requesting the selection determiner 1d to make a determination based on this time difference information. The process for requesting the determination performs a process for requesting the selection determiner 1d to determine whether the banner advertisement selection operation performed on the user terminal 4 is intended for the banner advertisement (pre-switching advertisement) displayed before the banner advertisement switching process or the banner advertisement (post-switching advertisement) displayed after the banner advertisement switching process. The process for confirming the time difference and the process for requesting the determination are described in detail below.

An example log stored in the log DB 6 is now described with reference to FIG. 3. The log is provided with the entries "log type", "user terminal information", "advertisement ID", and "time information".

The log type is available in two options: "banner request" and "advertisement request". The "banner request" is set for the above banner advertisement information request log and "advertisement request" is set for the above selected advertisement information request log.

The user terminal information is information identifying a user terminal 4. Examples of the user terminal information include an Internet Protocol (IP) address and a Media Access Control (MAC) address.

The advertisement ID is information uniquely identifying one of the various advertisements stored in the advertisement DB 5.

The time information can be used to estimate the time at which an operation or a process to be logged was performed. The time information of a log whose log type is "banner request" is, for example, the date and time at which the advertisement delivery system 1 receives the banner advertisement information request. The time information of a log whose log type is "advertisement request" is, for example, the date and time at which the advertisement delivery system 1 receives the selected advertisement information request.

The selection determiner 1d of the advertisement delivery system 1 shown in FIG. 2 performs the above determination process requested from the main controller 1a. Specifically, the selection determiner 1d performs a process for determining whether the time difference between the timing information of the banner advertisement switching process on the user terminal 4 (banner advertisement information request log) and the timing information of the banner advertisement selection operation by a user (selected advertisement information request log) is less than or equal to a predetermined time length, and notifies the determination result to the main controller 1a. This determination process determines which banner advertisement the banner advertisement selection operation by a user is intended for. The main controller 1a receives the notification and performs a predetermined process (selection handling process). Some examples of the determination process are described below.

The communication controller 1e performs a process for sending information, received over the communication network 2, to the main controller 1a and a process for sending various types of advertisement information, passed from the main controller 1a, to the user terminal 4.

The above "advertisement information manager 1b" corresponds to an "information manager" in the claims of the present invention. The above "log manager 1c" corresponds to a "timing information retriever" in the claims of the present invention. The above "main controller 1a" corresponds to a "selection handling processor" in the claims of the present invention.

2. Hardware Configuration

Figure 4:
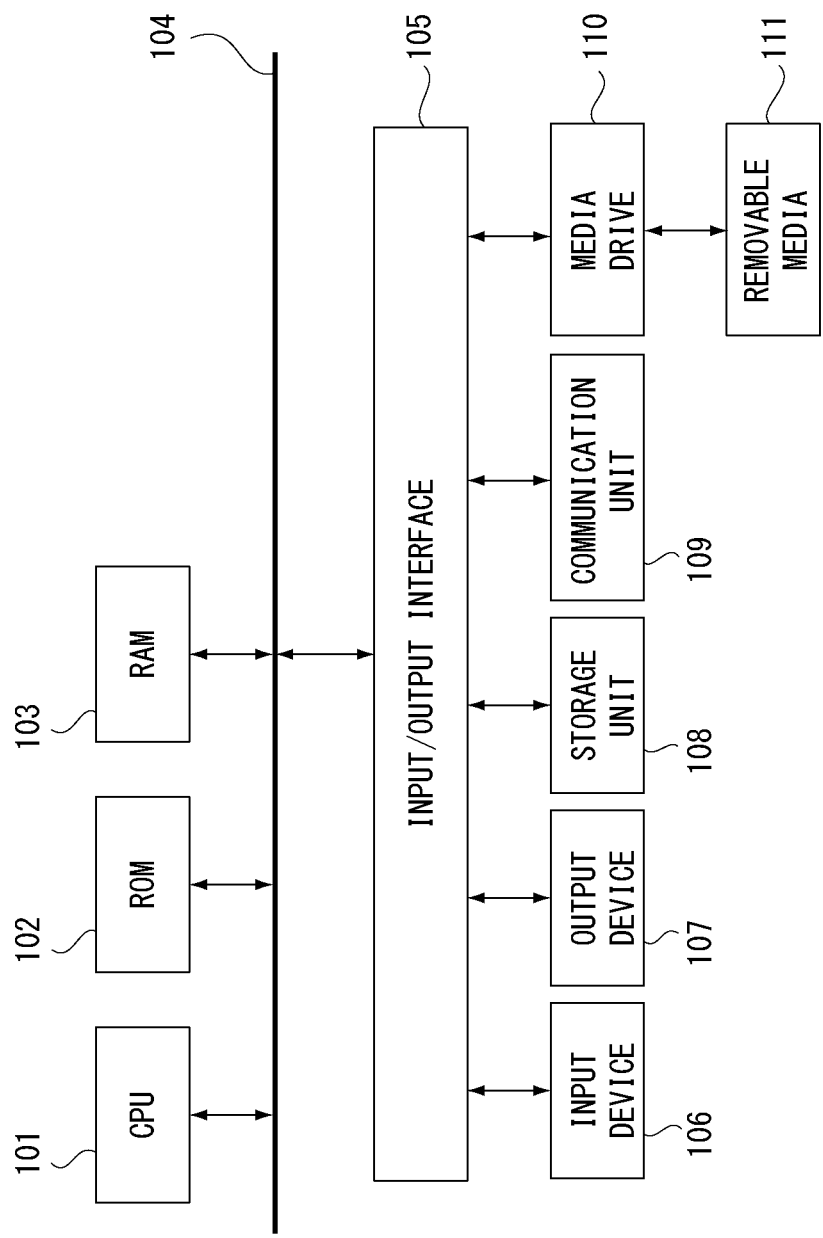
FIG. 4 is a block diagram of a computer according to the embodiment.

FIG. 4 is a diagram illustrating hardware of the advertisement delivery system 1, the web server 3, and the user terminals 4, which are shown in FIGS. 1 and 2. A Central Processing Unit (CPU) 101 of a computer device in each of the servers and each of the terminals performs various processing in accordance with programs stored in a Read Only Memory (ROM) 102 or programs loaded from a storage unit 108 to a Random Access Memory (RAM) 103. The RAM 103 also stores data required for the CPU 101 to perform the various processing and other data as appropriate.

The CPU 101, the ROM 102, and the RAM 103 are connected to each other via a bus 104. An input/output interface 105 is also connected to this bus 104.

An input device 106, an output device 107, the storage unit 108, and a communication unit 109 are connected to the input/output interface 105. The input device 106 includes, for example, a keyboard, a mouse, and a touch screen. The output device 107 includes, for example, a display, such as a Liquid Crystal Display (LCD), a Cathode Ray Tube (CRT), or an organic Electroluminescent (EL) panel, and a speaker. The storage unit 108 includes, for example, a Hard Disk Drive (HDD) and a flash memory device. The communication unit 109 performs communication processing and inter-device communications over the communication network 2.

A media drive 110 is also connected to the input/output interface 105 as needed. A removable medium 111, such as a magnetic disk, an optical disk, a magneto-optical disk, or a semiconductor memory, is mounted on the media drive 110 as appropriate, and then information is written to and read from the removable medium 111.

Such a computer device can upload and download data and programs through communications with the communication unit 109, and can exchange data and programs via the removable medium 111.

The CPU 101, which performs processing operations in accordance with various programs, causes each of the various information processing devices such as the advertisement delivery system 1, the web server 3, and the user terminals 4 to perform information processing and communications, which are described below.

An information processing device such as the advertisement delivery system 1, each information processing device constituting the web server 3, and the user terminals 4 are not limited to a single computer device as illustrated in FIG. 4, and may include a plurality of computer devices integrated into a system. The plurality of computer devices may be integrated into a system, for example, via a LAN, or may be located remote from each other, for example, over a virtual private network (VPN) using the Internet.

3. Process Flow

Figure 5:
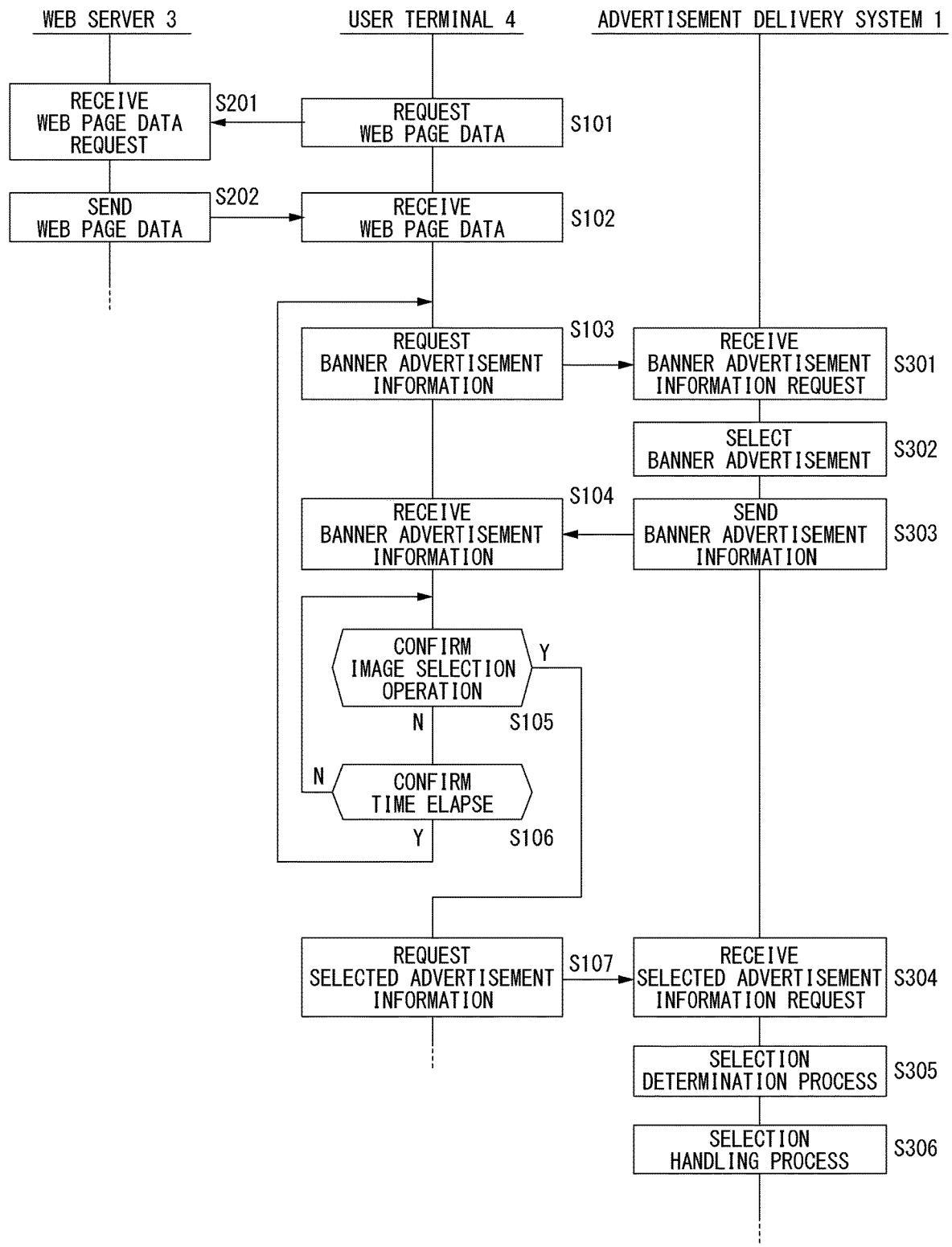
FIG. 5 is diagram for explaining an overall process flow.

The following describes a flow of processes performed by the advertisement delivery system 1, the web server 3, and the user terminal 4 with reference to FIG. 5.

The following describes a flow of respective processes performed by the advertisement delivery system 1, the web server 3, and the user terminal 4 when a user, who views a web page including an advertisement frame that switches between banner advertisements at prearranged intervals with the user terminal 4, selects one of the banner advertisements, for example, by clicking it. This embodiment describes an example where the web page includes one advertisement frame that displays one banner advertisement after another at prearranged intervals.

When the user launches software such as a web browser on the user terminal 4 and accesses a web page to view the web page, the user terminal 4 performs a process for requesting web page data from the web server 3 in Step S101. Subsequently, in response to this process, the web server 3 performs a process for receiving the web page data request in Step S201, and performs a process for sending the web page data to the user terminal 4 in Step S202. In response to this sending process, the user terminal 4 performs a process for receiving the web page data in Step S102. In this process, the user terminal 4 performs a process for analyzing the web page data and causing the web browser to display prescribed characters and images.

Then, in Step S103, the user terminal 4 performs a banner advertisement information request process for requesting information such as a simple image of a banner advertisement to be displayed in a predetermined position on the web browser from the advertisement delivery system 1. In the banner advertisement information request process, the user terminal 4 may send, for example, information about the user, a keywords included in the web page, and the like as information required to select a banner advertisement that reflects the interest of a user.

Following this process, the main controller 1a of the advertisement delivery system 1 performs a banner advertisement information request reception process in Step S301. In the banner advertisement information request receipt process, the main controller 1a instructs the advertisement information manager 1b to perform a process for selecting a proper banner advertisement and instructs the log manager 1c to store a banner advertisement information request log relating to receiving the banner advertisement information request. As the time information of the banner advertisement information request log, for example, the time at which the banner advertisement information request was received is stored.

Subsequently, in Step S302, the advertisement information manager 1b of the advertisement delivery system 1 performs a banner advertisement selection process in accordance with the instruction received from the main controller 1a. In the banner advertisement selection process, the advertisement information manager 1b selects a banner advertisement to be displayed in the banner advertisement frame on the web browser of the user terminal 4, using, for example, the user information and the description of the web page. When there are a plurality of candidates for the banner advertisement, the advertisement information manager 1b may let advertisers bid for the banner advertisement frame, as described above.

After the banner advertisement to be displayed in the advertisement frame is selected in Step S302, in Step S303, the main controller 1a of the advertisement delivery system 1 performs a banner advertisement information sending process for sending information about the banner advertisement selected by the advertisement information manager 1b. In the banner advertisement information sending process, the main controller 1a sends, for example, information (e.g., the URL) of a destination web page to be displayed by clicking simple image data or the banner advertisement displayed in the advertisement frame.

In response to the banner advertisement information sending process, the user terminal 4 performs a banner advertisement information reception process and displays the simple image of the banner advertisement in the advertisement frame on the web browser in Step S104.

Then, in Step S105, the user terminal 4 performs an image selection operation confirmation process for determining whether an image selection operation (e.g., an operation to click the banner advertisement image on the web browser) has been performed.

If the user terminal 4 determines in Step S105 that no image selection operation is has been performed, the user terminal 4 performs a time elapse confirmation process in the following Step S106. The time elapse confirmation process is a process for determining whether the elapsed time since the start of displaying a current banner advertisement has reached a display time length, which is the maximum time length allocated to the display of one banner advertisement.

In the time elapse confirmation process of Step S106, if the user terminal 4 determines that the above elapsed time has not yet reached the display time length, the user terminal 4 performs Step S105 again. If the user terminal 4 determines that the above elapsed time has reached the display time length, the user terminal 4 performs the banner advertisement information request process of Step S103 to display a different banner advertisement in the advertisement frame.

In the above image selection operation confirmation process of Step S105, if the user terminal 4 determines that an image selection operation has been performed, the user terminal 4 performs a selected advertisement information request process for requesting information about the banner advertisement, for which the selection operation by a user is intended, from the advertisement delivery system 1 in Step S107. In the selected advertisement information request process, the user terminal 4 performs a process for requesting, for example, web page data for displaying a web page (e.g., an item promotion page) associated with the banner advertisement on the web browser.

In response to the selected advertisement information request process of Step S107, the main controller 1a of the advertisement delivery system 1 performs a selected advertisement information request reception process to receive the request in Step S304, and the advertisement delivery system 1 then performs a selection determination process in Step S305.

In the selected advertisement information request reception process of Step S304, the main controller 1a instructs the log manager 1c to store a selected advertisement information request log relating to reception of the selected advertisement information request. As the time information of the selected advertisement information request log, for example, the time at which the selected advertisement information request was received is stored.

In the following selection determination process of Step S305, the log manager 1c retrieves necessary log information, and the selection determiner 1d performs the selection determination process. The selection determination process is a process for determining which banner advertisement the banner advertisement selection operation by a user is intended for. Specifically, the selection determination process is a process for determining whether the selection operation performed by a user just after switching between banner advertisement images is intended for the banner advertisement before the switching or the banner advertisement after the switching. That is, the selection determination process is a process for setting either one of the banner advertisements as the above selected advertisement information. The details are described below with some patterns.

Subsequently, the main controller 1a of the advertisement delivery system 1 performs a selection handling process in Step S306. The selection handling process is a process for sending web page data associated with the banner advertisement set in Step S305 as the advertisement information (selected advertisement information) to be sent to the user terminal 4. Specifically, the main controller 1a instructs the advertisement information manager 1b to retrieve the selected advertisement information. The web page data retrieved by the advertisement information manager 1b and associated with the banner advertisement is sent to the user terminal 4.

4. Selection Determination Process 4-1. First Example Process

A first example process of the selection determination process is now described with reference to FIG. 6.

As described above, the selection determination process is a process in response to the banner advertisement selection operation by a user (here, referred to as the "selection operation in question"). In the first example process, when a banner advertisement is clicked just after switching between banner advertisements, that is, when the timing of clicking the post-switching advertisement is just after switching between banner advertisements on the user terminal 4, it is determined that the pre-switching advertisement has been clicked.

First, in Step S401, the log manager 1c, which has received the instruction from the main controller 1a of the advertisement delivery system 1, performs a time information retrieval process. In the time information retrieval process, the log manager 1c retrieves the user terminal information and the time information t1 of the selected advertisement information request log, whose log type is "advertisement request", based on the selection operation by a user in question. The log manager 1c also retrieves, from the log DB 6, the time information t2 of the latest log (t2≤t1)), that has the same user terminal information, the log type "banner request", and time information of t1 or before. The retrieved time information t2 of the banner advertisement information request log and the retrieved time information t1 of the selected advertisement information request log are sent to the main controller 1a. Even when there is a relevant log, if there are less than two banner advertisement information request logs, the log manager 1c notifies the main controller 1a that the time information is not successfully retrieved. The reason is that if there is only one banner advertisement information request log, there is no pre-switching advertisement and thus the post-switching advertisement can be uniquely identified as the banner advertisement for which the selection operation by a user is intended. Specifically, when the banner advertisement information request log of a banner advertisement (advertisement A) is recorded, then the banner advertisement information request log of another banner advertisement (advertisement B) is recorded, and shortly after that a selected advertisement information request log is recorded, it may be uncertain whether the selection operation is intended for the advertisement A or B. However, when the banner advertisement information request log of the banner advertisement (advertisement A) is recorded and then the selected advertisement information request log is recorded, the advertisement A is a sole banner advertisement that can be selected.

Subsequently, in Step S402, the main controller 1a determines whether the time information is successfully retrieved. If the time information is not successfully retrieved, the main controller 1a terminates the selection determination process shown in FIG. 6.

If the main controller 1a determines that the time information is successfully retrieved, in Step S403, the selection determiner 1d performs a process for determining whether the selection operation by a user in question is an operation on the pre-switching advertisement or an operation on the post-switching advertisement, in accordance with the instruction of the main controller 1a. That is, the selection determiner 1d performs a process for determining whether the difference between the time information t1 and the time information t2 is less than or equal to a predetermined value T0, specifically, a process for determining whether (t1−t2) ≤T0 is satisfied.

If the selection determiner 1d determines in Step S403 that (t1−t2)≤T0 is satisfied, in Step S404, the main controller 1a of the advertisement delivery system 1 sets pre-switching advertisement information as the advertisement information (selected advertisement information) to be sent to the user terminal 4 and terminates the selection determination process.

If the selection determiner 1d determines in Step S403 that (t1−t2)≤T0 is not satisfied, in Step S405, the main controller 1a of the advertisement delivery system 1 sets post-switching advertisement information as the advertisement information (selected advertisement information) to be sent to the user terminal 4 and terminates the selection determination process.

Consequently, in the above-described selection handling process of Step S306, proper web page data is sent to the user terminal 4, based on the selected advertisement information set in the selection determination process.

4-2. Second Example Process

A second example process of the selection determination process is now described with reference to FIG. 7.

In the second example process, when a banner advertisement is clicked just after switching between banner advertisements, a process for confirming, by questioning a user, which banner advertisement the user has clicked is performed.

Steps S501 and S502 are the same as the above Steps S401 and S402, and thus are not described herein.

If the main controller 1a determines in Step S502 that the time information was successfully retrieved, in Step S503, the selection determiner 1d performs a process for determining whether to confirm the banner advertisement for which the selection operation by a user in question is intended, in accordance with the instruction of the main controller 1a of the advertisement delivery system 1. That is, the selection determiner 1d performs a process for determining whether (t1−t2)≤T0 is satisfied.

Figure 8:
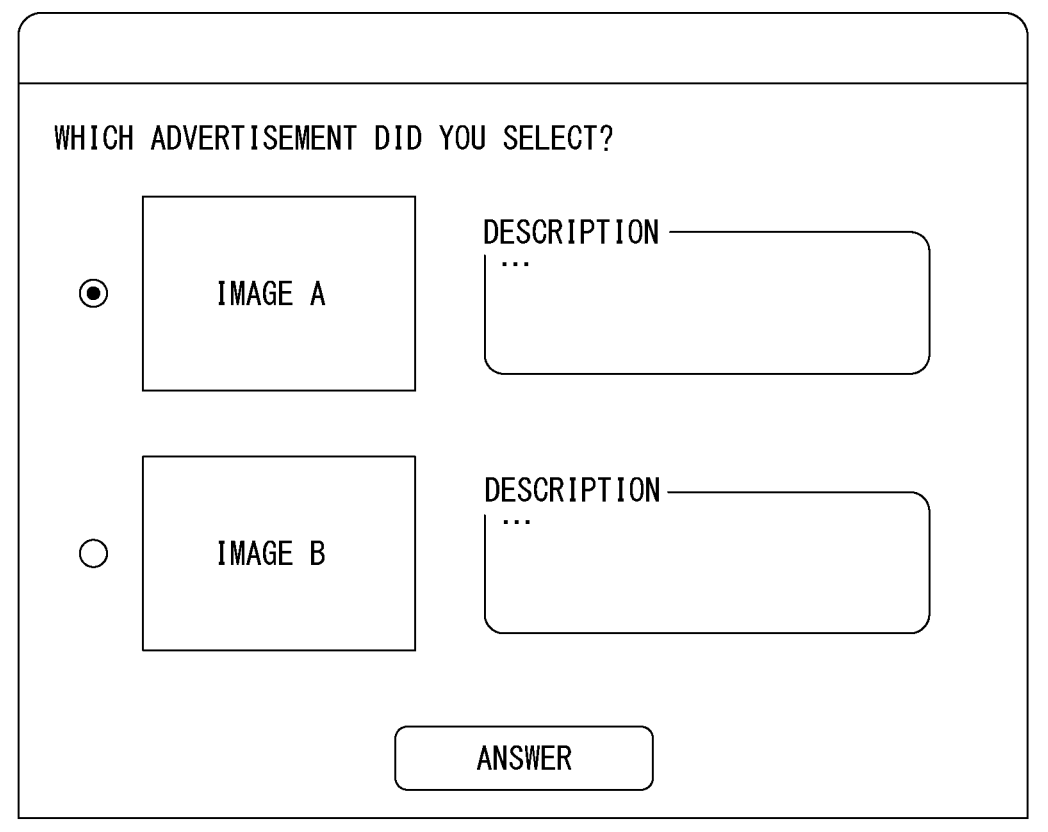

If the selection determiner 1d determines in Step S503 that (t1−t2)≤T0 is satisfied, that is, if the selection determiner 1d determines that it is necessary to confirm the user which of the advertisements before or after the switching the selection operation in question is intended for, the main controller 1a of the advertisement delivery system 1 performs a selection screen presentation process in Step S504. In the selection screen presentation process, a screen to prompt the user to choose either the pre-switching advertisement or the post-switching advertisement is displayed on the user terminal 4. The selection screen is, for example, as shown in FIG. 8, a dialog box displaying a question to prompt a choice, an image A as the pre-switching advertisement, an image B as the post-switching image, and descriptions of the images (e.g., item descriptions). A radio button is located on the left of each of the images A and B. An answer button is also located in the lower-side area of the dialog box. When the answer button is pressed, the banner advertisement selected by the user is sent as the selection result to the advertisement delivery system 1.

The "selection screen presentation process" corresponds to a "confirmation process" in the claims of the present invention.

Referring back to FIG. 7, in Step S505, the main controller 1a performs a process for determining whether the result of selection on the above selection screen, sent from the user terminal 4, is the pre-switching advertisement. If the result of selection by a user is the pre-switching advertisement, in Step S506, the main controller 1a sets the pre-switching advertisement information as the selected advertisement information, and terminates the selection determination process.

If the selection result in Step S505 is the post-switching advertisement, in Step S507, the main controller 1a sets the post-switching advertisement information as the selected advertisement information, and terminates the selection determination process.

If the selection determiner 1d determines in Step S503 that (t1−t2)≤T0 is not satisfied, that is, the selection determiner 1d determines that a banner advertisement selection operation has been performed after long enough after switching between banner advertisements, in Step S507, the main controller 1a sets the post-switching advertisement information as the selected advertisement information, and terminates the selection determination process.

Consequently, in the above-described selection handling process of Step S306, proper web page data is sent to the user terminal 4, based on the selected advertisement information set in the selection determination process.

5. Other Modifications

In the embodiment described above, the advertisement delivery system 1 performs the selection determination process of Step S305 and the selection handling process of Step S306, and the like. However, the advertisement delivery system 1 may only perform a process for returning the requested advertisement information, such as an image for a banner advertisement and the web page data of an advertisement page. In this case, the web server 3 performs the various determination processes and performs a process for retrieving a proper advertisement from the advertisement delivery system 1 as needed.

Also, the advertisement delivery system 1 and the web server 3 may be the same information processing device. In this case, Steps S201, S202, S301 to S306 shown in FIG. 5 are performed by the same information processing device.

In the above description, the time information of the banner advertisement information request log (or the selected advertisement information request log) is the time at which the banner advertisement information request (or the selected advertisement information request) is received. However, a program that delivers time information about when switching between banner advertisements is performed (or time information about when an operation to select a banner advertisement is performed) to the advertisement delivery system 1 may be included in the web page data sent in the above Step S202. In this case, not the time at which the advertisement delivery system 1 receives the various requests but time information when the processes are actually performed on the user terminal 4 can be obtained.

When the advertisement delivery system 1 solely performs the process for returning the requested advertisement information, the web server 3 can obtain the time information relating to each log by receiving the various requests from the user terminal 4.

Whereas the above embodiment describes the example where a web page provided by the web server 3 includes one advertisement frame, the web page may include a plurality of advertisement frames. In this case, in the selected advertisement information request process of Step S107 shown in FIG. 5, information about the advertisement frame in which the banner advertisement selected by the user is positioned is also provided from the user terminal 4 to the advertisement delivery system 1. Then, in the time information retrieval process of Step S401, the log manager 1c searches for and retrieves a selected advertisement information request log that has the same user terminal information as the selected advertisement information request log and information about the same advertisement frame. When the advertisement frame in which the banner advertisement selected by the user is positioned is an advertisement frame in which the switching between banner advertisements is not performed, the main controller 1a may skip the determination in Step S305 shown in FIG. 5 and perform Step S306 for the banner advertisement selected by the user.

Further, the example where an IP address and a MAC address are stored as the user terminal information of each log is described above. However, in addition to those, a different ID may be stored therewith every time a web page is viewed. Specifically, even when a user views a web page A with the user terminal 4 and then views a web page B with the same user terminal 4, different pieces of user terminal information may be stored. This prevents the banner advertisement information request log of a banner advertisement (advertisement A), displayed when the web page A was viewed, from being used in the selection determination process for an operation to select another banner advertisement (advertisement B), displayed when the web page B is viewed. Consequently, this prevents the selection determiner 1d from determining that the advertisement A, displayed when the old web page A was viewed, has been selected.

Also even when the user views the same web page A, different user terminal information may be stored every time the web page A is viewed. Specifically, when the user views the web page A with the user terminal 4 and then performs an operation to reload the web page A, the user terminal information stored in various logs for the advertisement A, which is displayed when the first web page A was viewed, is different from the user terminal information stored in various logs for an advertisement A', which is displayed when the web page A after the reloading is viewed.

Furthermore, even when the size of an advertisement frame on a web page changes depending on banner advertisements, any process performed by the above-described advertisement delivery system 1 can be applied as long as the display areas partially overlap in an identical area.

6. Summary

The above-described advertisement delivery system 1 includes the advertisement information manager 1b as an information manager, the log manager 1c as a timing information retriever, the selection determiner 1d, and the main controller 1a as a selection handling processor. When switching between images displayed in a partial area on a web page has been performed, the advertisement information manager 1b keeps information about the pre-switching image even after the switching. The log manager 1c retrieves the timing of the switching and the timing of a selection operation by a user on the area. When the log manager 1c retrieves the timing of the selection operation within a predetermined time length since the switching, the selection determiner 1d makes a determination as to which of the pre-switching image and the post-switching image the selection operation is intended for. Based on the determination, the main controller 1a performs a selection handling process based on information about the pre-switching image or the post-switching image.

Thus, when an image selection operation is performed after switching between images, whether the selection operation is intended for the pre-switching image or the post-switching image is determined.

This prevents image selection not intended by the user and thus can prevent screen transition not intended by the user.

Furthermore, for example, when the advertisement delivery system 1 is configured so that a different advertisement is displayed every time a web page is displayed, even if the user views a page again before transition to an advertisement page, an advertisement that the user intends to select is not always redisplayed. This makes it difficult for the user to find a desired advertisement and thus can lead to the loss of opportunities for advertisers to sell items. The above-described advertisement delivery system 1 can also solve such a problem.

Figure 7:
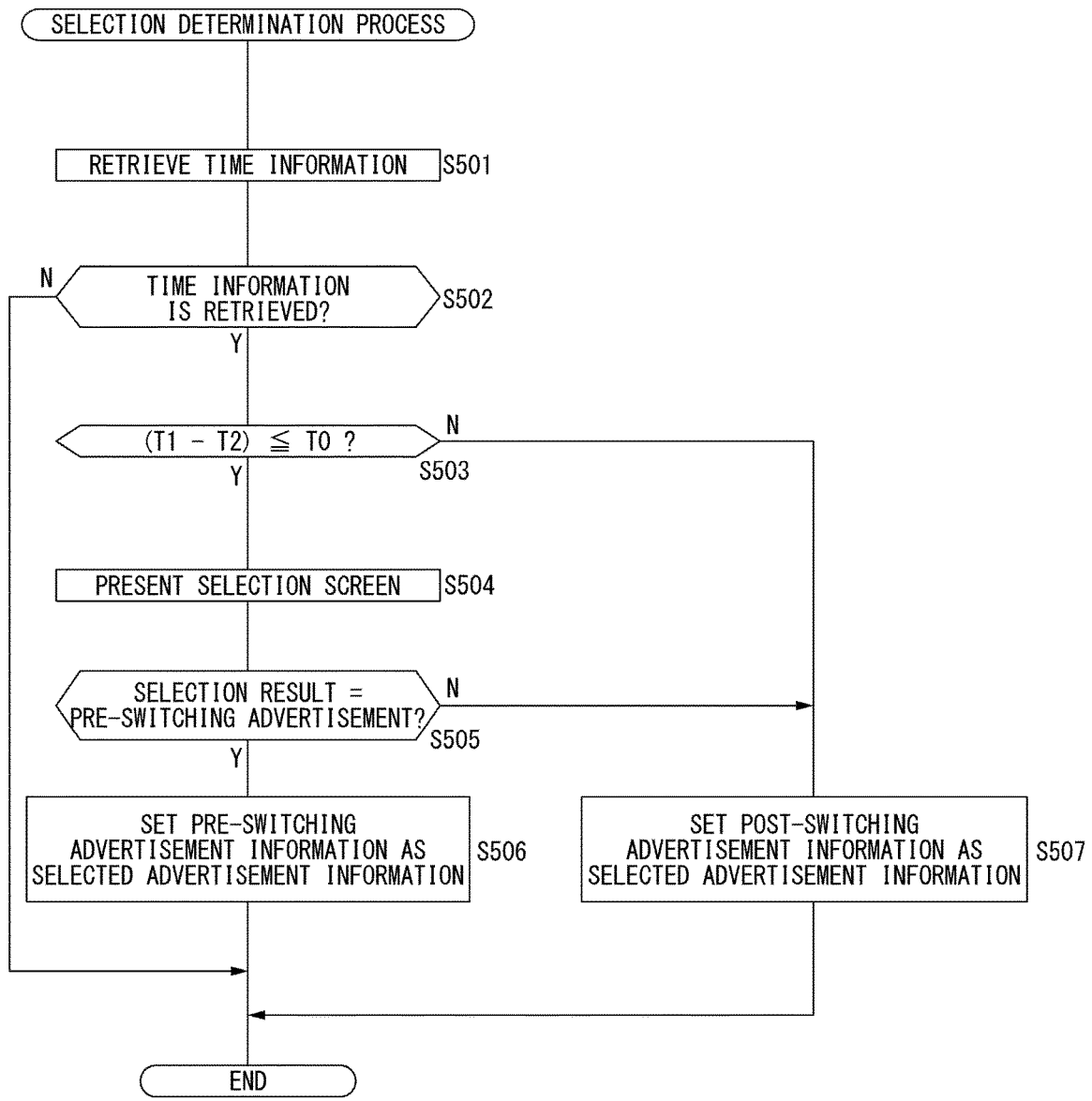
FIG. 7 is a flowchart showing a second example process of the selection determination process.

In addition, as shown in Step S503 in FIG. 7, when the difference between the timing of the switching (the retrieved time information t2 of the banner advertisement information request log) and the timing of the selection operation (the time information t1 of the selected advertisement information request log) is less than or equal to the a predetermined time length T0, the selection determiner 1d performs a confirmation screen presentation process for presenting to the user a confirmation screen (see FIG. 8) to confirm which image the selection operation by a user is intended for, and the selection determiner 1d makes the determination based on an answer by the user on the confirmation screen.

This enables the result of handling the selection operation to reflect the intention of a user, without placing a tremendous burden on the user.

Figure 6:
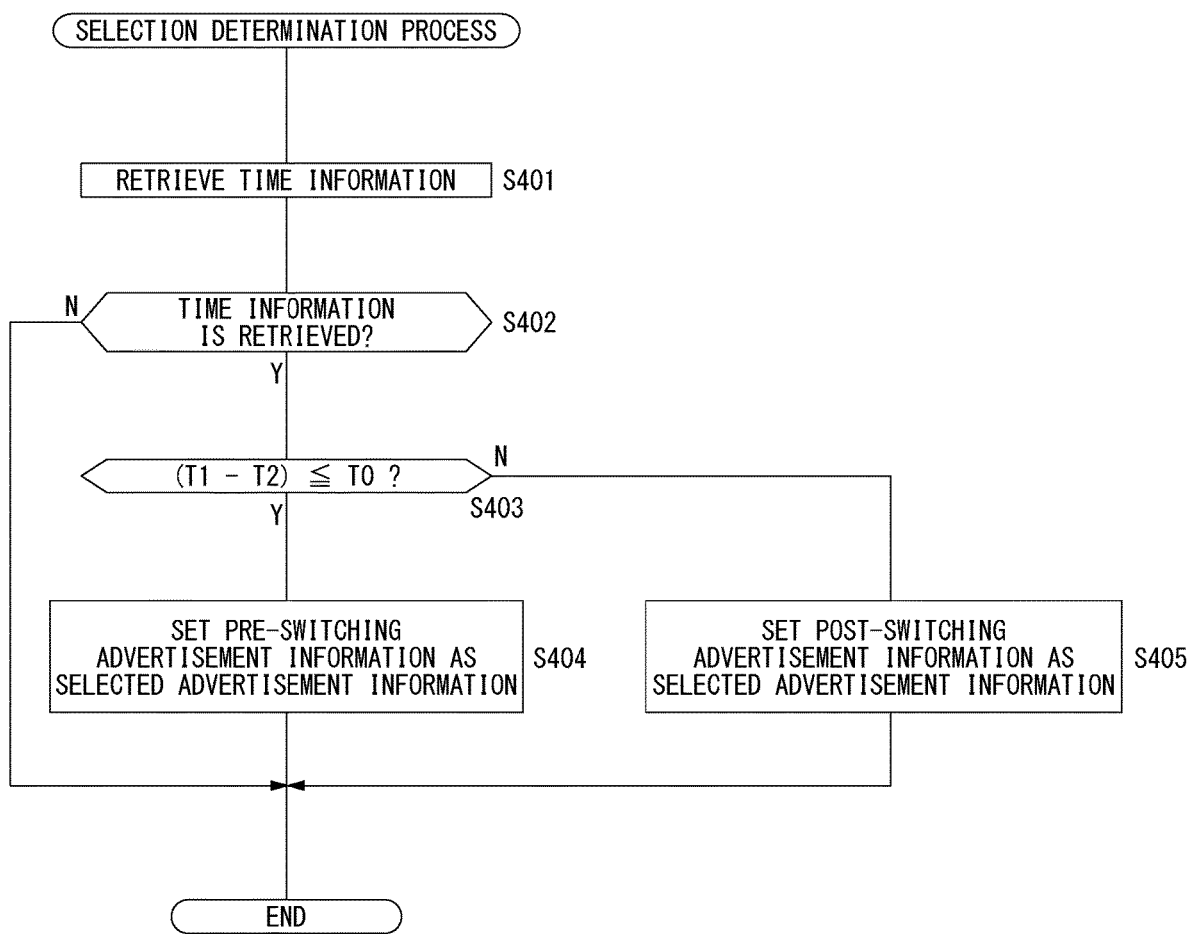
FIG. 6 is a flowchart showing a first example process of a selection determination process.

Moreover, as described in Steps S403, S404, and S405 in FIG. 6, when the difference between the timing of the switching (the retrieved time information t2 of the banner advertisement information request log) and the timing of the selection operation (the time information t1 of the selected advertisement information request log) is less than or equal to the a predetermined time length, the selection determiner 1d determines that the operation by a user subject to the determination is intended for the pre-switching image.

This allows for estimation of the image for which the selection operation by a user is intended, without increasing the burden on the user, and thus can prevent a situation that makes the user stressed.

In addition, as described in the above embodiment, information about image selection is the address of a destination web page to be displayed in response to image selection, and the selection handling process is a process for causing the destination web page to be displayed.

This prevents the selection of an image not intended by the user from causing unintended and time-wasting screen transition.

Furthermore, as described in the above embodiment, the pre-switching image and the post-switching image are banner advertisement images.

This prevents the time-wasting screen transition to an advertisement page for an item that the user does not intend to purchase and also prevents the unintended item from being recorded in a viewing history. Thus, for example, when used in combination with a system that provides each user with advertisements that fit the preferences of a respective user based on the respective viewing history of the user, improper advertisements can be prevented from being presented to the user.

7. Program and Storage Medium

The advertisement delivery system 1 according to the present invention is as described above. A program according to the embodiment is a program for causing a processor (e.g., a CPU) to execute the processes in the advertisement delivery system 1.

When switching between images displayed in a partial area on a web page has been performed, the program according to the embodiment causes the processor to execute a step of keeping information about a pre-switching image even after the switching.

The program also causes the processor to execute a step of retrieving the timing of the switching and the timing of a selection operation by a user on the area.

When the timing of the selection operation is retrieved within a predetermined time length after the switching, the program further causes the processor to execute a step of making a determination as to which of the pre-switching image and the post-switching image the selection operation is intended for.

Based on the determination, the program also further causes the processor to execute a step of performing a selection handling process based on information about the pre-switching image or the post-switching image.

That is, this program is a program for causing the processor to execute Steps S304 to S306 described with reference to FIG. 5, Steps S401 to S405 described with reference to FIG. 6, and Steps S501 to S507 described with reference to FIG. 7.

This program can be executed on the user terminal 4. To that end, the program only needs to be included in the web page data sent from the web server 3 so that Steps S304 to S306 described with reference to FIG. 5, Steps S401 to S405 described with reference to FIG. 6, and Steps S501 to S507 described with reference to FIG. 7 are executed on the user terminal 4.

Such a program can achieve the above-described advertisement delivery system 1.

The program can be prestored, for example, in a HDD as a storage medium built in a computer device or a ROM in a microcomputer including a CPU. Alternatively, the program can be temporarily or permanently stored (recorded) in a removable storage medium, such as a semiconductor memory, a memory card, an optical disk, a magneto-optical disk, or a magnetic disk.

Such a removable storage medium can be provided as what is called package software.

The program can not only be installed from the removable storage medium, for example, to a personal computer, but also be downloaded from a download site over a network, such as a LAN and the Internet.

REFERENCE SIGNS LIST

1 advertisement delivery system, 1*a* main controller, 1*b* advertisement information manager, 1*c* log manager, 1*d* selection determiner, 1*e* communication controller, 2 communication network, 3 web server, 4 user terminal, 5 advertisement DB, 6 log DB

What is claimed is:

1. An information providing device for determining a selection operation with respect to a display which automatically displays one image after another in a partial area of a display area at a plurality of prearranged intervals, wherein the plurality of prearranged intervals includes a first interval, and wherein the first interval automatically begins at a first time and automatically ends at a second time, the information providing device comprising:
   at least one memory configured to store computer program code; and
   at least one processor configured to read said computer program code and operate according to said computer program code, said computer program code including:
   display code configured to cause at least one of said at least one processor to automatically display a first image in the partial area of the display area beginning at a first time, and automatically display, instead of the first image, a second image in the partial area of the display area beginning at a second time after the first time, wherein the first image is associated with first information and the second image is associated with second information, wherein the second information is different from the first information,
   receive code configured to cause at least one of said at least one processor to receive an information request based on the selection operation, by a user, in the partial area of the display area at a third time after the second time, and store a log relating to the information request in a log database,
   selection determining code configured to cause at least one of said at least one processor to determine:
   i) the selection operation is an operation to select the first image when a difference between the third time and the second time is less than a predetermined value, wherein the predetermined value is defined to detect that the third time occurred in less time after the second time than required to form an intention to select the second image, and
   ii) the selection operation is an operation to select the second image when a difference between the third time and the second time is greater than or equal to the predetermined value, and
   information processing code configured to cause at least one of said at least one processor to:
   A) when the selection by the user corresponds to the first image:
   obtain the first information associated with the first image, and
   provide the first information via the display area, and
   B) when the selection by the user corresponds to the second image:
   obtain the second information associated with the second image, and
   provide the second information via the display area.

2. The information providing device of claim 1, wherein:
   the display code is further configured to cause the information providing device to determine the selection operation by displaying a confirmation screen to the user; and
   the receive code is configured to cause the information providing device to receive a second selection operation by the user.

3. The information providing device of claim 1, wherein the display code is configured to cause the information providing device to determine the second time as the sum of the first time and a display time length, wherein the display time length is a maximum time length allocated to a display of one banner advertisement.

4. The information providing device of claim 1, further comprising address obtaining code configured to cause at least one of said at least one processor to obtain the first information, wherein the first information includes a Uniform Resource Locator (URL) of a web page associated with the first image.

5. A method for determining a selection operation with respect to a display which automatically displays one image after another in a partial area of a display area at a plurality of prearranged intervals, wherein the plurality of prearranged intervals includes a first interval, and wherein the first interval automatically begins at a first time and automatically ends at a second time, the method to be performed by at least one processor, the method comprising:
   automatically displaying a first image in the partial area of the display area beginning at a first time;
   automatically displaying, instead of the first image, a second image in the partial area of the display area beginning at a second time after the first time, wherein the first image is associated with first information and the second image is associated with second information, wherein the second information is different from the first information;
   receiving an information request based on the selection operation, by a user, in the partial area of the display area at a third time after the second time, and storing a log relating to the information request in a log database;
   determining the selection operation is an operation to:
      i) select the first image when a difference between the third time and the second time is less than a predetermined value, wherein the predetermined value is defined to detect that the third time occurred in less time after the second time than required to form an intention to select the second image, and
      ii) select the second image when a difference between the third time and the second time is greater than or equal to the predetermined value;
   A) when the selection by the user corresponds to the first image:
      obtaining the first information associated with the first image, and
      providing the first information via the display area; and
   B) when the selection by the user corresponds to the second image:
      obtaining the second information associated with the second image, and
      providing the second information via the display area.

6. The method of claim 5, further comprising:
   confirming the intention of the user by displaying a confirmation screen to the user; and
   receiving a second selection operation by the user.

7. The method of claim 5, further comprising determining the second time as the sum of the first time and a display time length, wherein the display time length is a maximum time length allocated to a display of the first image.

8. The method of claim 5, wherein the first information includes a universal record locator (URL) address associated with the first image.

9. An information providing device for determining a selection operation with respect to a display which automatically displays one image after another in a partial area of a display area at a plurality of prearranged intervals, wherein the plurality of prearranged intervals includes a first interval, and wherein the first interval automatically begins at a first time and automatically ends at a second time, the information providing device comprising:
   at least one memory configured to store computer program code; and
   at least one processor configured to read said computer program code and operate according to said computer program code, said computer program code including:
   display code configured to cause at least one of said at least one processor to automatically display a first image in the partial area of the display area beginning at a first time, and automatically display, instead of the first image, a second image in the partial area of the display area beginning at a second time after the first time, wherein the first image is associated with first information and the second image is associated with second information, wherein the second information is different from the first information,
   receive code configured to cause at least one of said at least one processor to receive an information request based on the selection operation, by a user, in the partial area of the display area at a third time after the second time, and store a log relating to the information request in a log database,
   selection determining code configured to cause at least one of said at least one processor to determine:
      i) the selection operation is an operation to select the first image when a difference between the third time and the second time is less than a predetermined value, and
      ii) the selection operation is an operation to select the second image when a difference between the third time and the second time is greater than or equal to the predetermined value, and
   information processing code configured to cause at least one of said at least one processor to:
   A) when the selection by the user corresponds to the first image:
      obtain the first information associated with the first image, and
      provide the first information via the display area, and
   B) when the selection by the user corresponds to the second image:
      obtain the second information associated with the second image, and
      provide the second information via the display area.

10. The information providing device of claim 9, wherein the predetermined value is defined to detect that the third time occurred in less time after the second time than required to form an intention to select the second image.

11. The information providing device of claim 9, wherein the first image is a pre-switching image, the second image is a post-switching image, and the selection determining code is further configured to, based on the predetermined value, detect whether the selection operation by the user is intended for the pre-switching image or the post-switching image.

12. The information providing device of claim 9, wherein the first image is a pre-switching image, the second image is a post-switching image, and the predetermined value is defined to reduce an occurrence of a storage to a user database of an incorrect viewing log entry associated with the post-switching image.

13. The information providing device of claim 1, wherein the first image is a pre-switching image, the second image is a post-switching image, and the selection determining code is further configured to, based on the predetermined value, detect whether the selection operation by the user is intended for the pre-switching image or the post-switching image.

14. The information providing device of claim 1, wherein the first image is a pre-switching image, the second image is a post-switching image, and the predetermined value is defined to reduce an occurrence of a storage to a user database of an incorrect viewing log entry associated with the post-switching image.

15. The method of claim 5, wherein the first image is a pre-switching image, the second image is a post-switching image, and the selecting further comprises, based on the predetermined value, detecting whether the selection operation by the user is intended for the pre-switching image or the post-switching image.

16. The information providing device of claim 1, wherein the information processing code is further configured to cause the at least one of said at least one processor to:
   obtain, from the selection determining code based on the selection operation of the user, a determination of the intention of the user;
   obtain the first information based on the determination, or obtain the second information based on the determination.

17. The method of claim 5, further comprising:
   obtaining, from the selection determining code based on the selection operation of the user, a determination of the intention of the user,
   wherein the obtaining the first information further comprises obtaining the first information based on the determination, and
   wherein the obtaining the second information further comprises obtaining the second information based on the determination.

18. The information providing device of claim 9, wherein the information processing code is further configured to cause the at least one of said at least one processor to:
   obtain, from the selection determining code based on the selection operation of the user, a determination of the intention of the user;
   obtain the first information based on the determination, or obtain the second information based on the determination.

* * * * *